(12) United States Patent
Sarup (10) Patent No.: US 9,816,047 B2
(45) Date of Patent: Nov. 14, 2017

(54) DEACIDIFICATION OF FATS AND OILS (71) Applicant: Alfa Laval Corporate AB, Lund (SE)

(72) Inventor: Bent Sarup, Fredensborg (DK)

(73) Assignee: ALFA LAVAL CORPORATE AB, Lund (SE)

( * ) Notice: Subject to any disclaimer, the term of this patent is extended or adjusted under 35 U.S.C. 154(b) by 473 days.

(21) Appl. No.: 14/406,286

(22) PCT Filed: Jun. 19, 2013

(86) PCT No.: PCT/EP2013/062705
§ 371 (c)(1),
(2) Date: Dec. 8, 2014

(87) PCT Pub. No.: WO2014/009117
PCT Pub. Date: Jan. 16, 2014

(65) Prior Publication Data
US 2015/0144479 A1    May 28, 2015

(30) Foreign Application Priority Data
Jul. 12, 2012 (EP) .................................... 12176123

(51) Int. Cl.
*C11B 3/14* (2006.01)
*C11B 3/12* (2006.01)
(Continued)

(52) U.S. Cl.
CPC .................. *C11B 3/14* (2013.01); *B01D 1/22* (2013.01); *B01D 3/06* (2013.01); *B01D 3/10* (2013.01);
(Continued)

(58) Field of Classification Search
CPC . B01D 3/06; B01D 3/10; B01D 3/148; B01D 3/22; B01D 3/26; C11B 3/12; C11B 3/14
See application file for complete search history.

(56) References Cited

U.S. PATENT DOCUMENTS 4,089,880 A    5/1978  Sullivan
4,804,555 A    2/1989  Marschner et al.
(Continued)

FOREIGN PATENT DOCUMENTS

CN    1199418 A    11/1998
CN    1495251 A    5/2004
(Continued)

OTHER PUBLICATIONS

English translation of the Notice of Reasons for Rejection for Japanse Application No. 2015-520877 dated Feb. 15, 2016.
(Continued)

*Primary Examiner* — Brian McCaig
(74) *Attorney, Agent, or Firm* — Birch, Stewart, Kolasch & Birch, LLP (57) ABSTRACT

The invention relates to method for deacidification of fats and oils comprising: feeding stream (1) to a stripping section; condensing the volatile phase in a high temperature condensing zone, sending the condensed phase to distillation A; distillating the condensed phase, obtaining a volatile stream; passing the volatile stream along with the vapor phase from the condensation zone to a cold condensation zone obtaining a condensate and a stream (4); allowing stream (4) to continue to vacuum system and subjecting the cold condensate to distillation B; and producing a stream of fatty acids (5) and a stream of micronutrients (6).

15 Claims, 4 Drawing Sheets

(51) Int. Cl.
*B01D 3/06* (2006.01)
*B01D 3/10* (2006.01)
*B01D 3/26* (2006.01)
*B01D 1/22* (2006.01)
*B01D 3/14* (2006.01)

(52) U.S. Cl.
CPC ............ *B01D 3/148* (2013.01); *B01D 3/26* (2013.01); *C11B 3/12* (2013.01)

(56) References Cited

U.S. PATENT DOCUMENTS

| | | |
|---|---|---|
| 5,512,691 A | 4/1996 | Barnicki et al. |
| 5,658,433 A | 8/1997 | Baird |
| 5,932,261 A | 8/1999 | Unnithan |
| 6,001,220 A | 12/1999 | Hillström et al. |
| 6,750,359 B1 | 6/2004 | Copeland et al. |
| 8,177,986 B2 | 5/2012 | Gullov-Rasmussen |
| 2004/0030166 A1 | 2/2004 | Copeland et al. |
| 2005/0051419 A1 | 3/2005 | Zima et al. |
| 2006/0189815 A1 | 8/2006 | Tou |
| 2008/0051599 A1 | 2/2008 | Adami et al. |
| 2011/0220483 A1 | 9/2011 | Margnat et al. |

FOREIGN PATENT DOCUMENTS

| | | |
|---|---|---|
| CN | 1556847 A | 12/2004 |
| CN | 1649653 A | 8/2005 |
| CN | 1821238 A | 8/2006 |
| CN | 1849331 A | 10/2006 |
| CN | 102089263 A | 6/2011 |
| ES | 2043560 A1 | 12/1993 |
| GB | 2 139 242 A | 11/1984 |
| JP | 59-68398 A | 4/1984 |
| JP | 3-500054 A | 1/1991 |
| JP | 11-512144 A | 10/1999 |
| JP | 2002-511108 A | 4/2002 |
| WO | WO 98/00484 A1 | 1/1998 |
| WO | WO 00/49116 A1 | 8/2000 |

OTHER PUBLICATIONS

English translation of the Chinese Office Action and Search Report for Chinese Application No. 201380036992.7, dated Feb. 1, 2016.
International Search Report, issued in PCT/EP2013/062705, dated Oct. 24, 2013.
Search Report issued in European priority application 12 17 6123, dated Jan. 11, 2013.
Written Opinion of the International Searching Authority, issued in PCT/EP2013/062705, dated Oct. 24, 2013.

DEACIDIFICATION OF FATS AND OILS

The present invention relates to a method for deacidification of fats and oils.

BACKGROUND

Most edible oils go through refining operations comprising pretreatment steps known as degumming and/or neutralisation, most often followed by treatment with a solid adsorbent, e.g. acid activated clay, known as bleaching. Pretreatment of oils for non-edible use, such as manufacture of biodiesel, may or may not include the bleaching operation. The pretreated oil is subsequently subjected to a high temperature operation known as deodorization. Deodorisation is conducted under vacuum and consists in general of two main process steps, a "heat bleaching" step, typically conducted within a range from about 240 to about 270° C. within a range of about 0.5 to about 1.5 hrs retention time and a second step consisting of stripping of volatiles by the use of steam. These steps may occur simultaneously or sequentially. Pretreatment of oil for non-edible use such as biodiesel manufacture does normally not include the heat bleaching step. Steam stripping, also known as de-acidification, of fats and oils, comprises reduction of the content of free fatty acid (FFA) and other volatiles by stripping with steam under vacuum. Volatiles are mainly those present in the pretreated oil, but volatiles may also be formed during the deodorisation operation, e.g. at the heat bleaching step. Steam stripping of volatile components may take place before, during or after the heat bleaching step, in any combination of those possibilities. An example of deodorisation conducted by steam stripping in combination with heat bleaching is disclosed by WO 98/00484. Simultaneously with the removal of FFA, the steam stripping action will also partly remove valuable components such as micronutrients including tocopherols, sterols, squalene as well as "neutral oils", i.e. tri-, di- and mono-acylglycerides (TAG, DAG, MAG), which represents a loss of valuable main product. Volatiles are condensed in a cold condensation zone, before the stripping steam along with non-condensable gases (e.g. inleakage air) are lead to the vacuum system.

Such a cold condensation zone commonly operates within a range from about 40 to about 60° C. and is commonly implemented as a scrubber loop, where cold distillate is used to condense the volatiles. The cold distillate will, besides the FFA:s, also contain micronutrients and "neutral oils". Due to the high value of the micronutrients there is particular interest in recovering those from the distillate. However, the micronutrients need to be enriched in their concentration in the plant so that their further processing in purification plants and transport to such plants can take place in an economical manner. The loss of "neutral oils" will further dilute any enriched stream of micronutrients that can be withdrawn from the system.

A current trend in the edible oil industry is to use certain enzymes, commonly known as phospholipase A ("PLA") type enzymes, to enable removal of phosphorous containing components ("phospholipids") of the crude edible oil down to very low ppm levels, acting by producing more water-soluble lysophospholipids by splitting off a fatty acid from the phospholipid. However, a side effect of this process is increased production of FFA, which will dilute the micronutrients in the deodorizer distillates. Another type of enzymes commonly known as phospholipase C ("PLC") type enzymes have also recently been taken into large scale industrial use. These enzymes give increased yields of oil-product by converting phospholipids to DAG. However, the increased level of DAG in the oils tends to aggravate the problem with neutral oils loss during the steam stripping operation since the vapour pressure of DAG is higher than the vapour pressure of TAG.

When pretreating biodiesel it is of interest to apply high severity conditions i.e. high stripping temperature for instance within the range 265 to 275° C., high amount of stripping steam for instance within the range 1 to 2% relative to the amount of oil feed, and deep vacuum for instance within the range 1.5 to 2 mbar in order to recover as much of the micronutrients as possible. However, such high severity conditions will also lead to increased losses of neutral oil, which, besides being a value loss, also will tend to dilute micronutrients.

THE INVENTION

Accordingly the present invention provides a solution to the above mentioned problems by the new method for acidification of fats and oils.

Thus, the present invention relates to a method for deacidification of fats and oils, which method comprises the following steps:
- step (i) feeding an oily feed stream to a vacuum steam stripping section, stripping off a volatile phase;
- step (ii) feeding the stripped off volatile phase to a high temperature condensing zone, partially condensing the volatile phase and obtaining a condensed phase and a vapour phase, sending the condensed phase to a first distillation, and sending the vapour phase to a cold condensation zone;
- step (iii) subjecting the condensed phase to a vacuum distillation operation and in this first distillation obtaining a volatile stream and a condensed oily phase;
- step (iv) feeding the vapour phase from the high temperature condensing zone, step (ii), optionally along with the volatile stream from the first distillation to the cold condensation zone producing a stream of non-condensable gases and a cold condensate, letting the stream of non-condensable gases to continue to a vacuum system and feeding the cold condensate to a second distillation; and
- step (v) subjecting the cold condensate to the second distillation producing a stream of fatty acids, a stream of micronutrients, and a stream of non-condensables, said non-condensables being sent to vacuum system together stream the non-condensable gases from the cold condensation zone to form steam of all non-condensable gases.

According to the method the stripped off volatile phase is a fraction of the oily feed together with or without steam. In step (i) steam could is fed to the stripping section. According to the method may the vacuum steam stripping section in step (i) be operating at a pressure within the range from 1 to 10 mbar, preferably within a range from 1.5 to 5 mbar vacuum level.

According to the method step (ii) comprises condensing lower volatility components from the vapour phase and sending the condensed phase to a first distillation and a remaining vapour phase is sent to cold condensation zone;

According to the method the condensed phase may be sent to a vacuum distillation operation in first distillation in step (iii) obtaining a volatile stream rich in micronutrients and fatty acids. The volatile stream along with the vapour phase from the high temperature condensation zone may be allowed to pass to a cold condensation zone, where a condensate and a stream of non-condensables are obtained. The condensed oily phase may be sent either directly or indirectly back to the stripper column. The volatile stream in step (iii) may be rich in micronutrients and fatty acids, and the volatile stream may be sent to the cold condensation zone. The condensed oily phase from step (iii) contains mainly of neutral oil. From the overhead system of this first distillation section a stream may be withdrawn rich in certain micronutrients and certain neutral oil, in this way adjusting the composition of the stream of micronutrients produced in step (v) and also produce a separate product stream with certain micronutrients and neutral oils.

As an alternative the overhead product from first distillation may be sent directly to second distillation without passing the cold condensation zone in the steam stripping column.

The stripped off volatile phase from the vacuum steam stripping section in step (i) may be condensed in the high temperature condensing zone in step (ii) at elevated temperature within the range from 130 to 220° C., preferably within the range from 140 to 160° C. The condensation in step (ii) can be implemented in a number of ways, such as scrubbing with a recirculating condensate, scrubbing the gas with cold condensate or using indirect heat exchange via a surface cooler.

According to the method the condensed neutral oils from the first distillation in step (iii) may be transferred back to the vacuum steam stripping section in step (i). Step (iii) also may comprise that the obtained volatile stream rich in micronutrients and fatty acids from the first distillation, hereinafter defined as distillation A, may be sent directly to the second distillation, hereinafter defined as distillation B, in step (v). According to an alternative, the obtained volatile stream rich in micronutrients and fatty acids from distillation A in step (iii) may be sent along with vapours from the high temperature condensation zone in step (ii) to a cold condensation zone in step (iv) obtaining a condensate and a stream of non-condensable gases.

According to the method the operations, distillation A and distillation B, may be selected from one or more, preferably one or two, of the operations in the group consisting of short-path distillation, wiped-film evaporators, vacuum flash operations, and counter-current multistage distillation columns.

According to the method the vacuum level in distillation A and the vacuum level in distillation B may be set to at least 0.001 mbar, preferably within the range from 1 to 10 mbar, preferably within a range from 2 to 5 mbar range to match the vacuum level already existing in the top part of the cold condensation zone.

According to the method step (i) may comprise feeding an oily feed stream, which stream comprises volatiles such as free fatty acids, micronutrients and neutral oils such as mixtures of tri-, di- and mono-acylglycerides, to a vacuum steam stripping section. Step (i) may also comprise stripping off fatty acids together with other volatiles, and neutral oils.

According to the method step (ii) may comprise feeding the stripped off fatty acids, micronutrients together with other volatiles, and volatile neutral oil components to a high temperature condensing zone, condensing fatty acids, micronutrients together with some volatiles and neutral oils from vapour phase and sending the condensed fatty acids, micronutrients together with some volatiles and neutral oils to distillation A in step (iii), and allowing steam, volatile fatty acids, some micronutrients together with other volatiles to pass to a cold condensation zone in step (iv).

According to the method step (iii) may comprise subjecting the condensed fatty acids, micronutrients together with some volatiles and neutral oils to a vacuum distillation operation in distillation A in step (iii) obtaining a volatile stream rich in micronutrients and fatty acids and removing neutral oils in distillation A, transferring the condensed neutral oils back to the vacuum steam stripping section in step (i), and transferring the obtained stream rich in micronutrients and fatty acids to the low temperature condensation zone in step (iv) along with vapors from the high temperature condensation zone in step (ii). Alternatively, or in combination with the just described routing, the volatiles from distillation A may be routed directly to distillation B.

According to the method step (iv) may comprise condensing volatile fatty acids, micronutrients together with other volatiles in a cold condensation zone obtaining a condensate and a stream comprising steam, non-condensable gases along with traces of fatty acids and other lighter hydrocarbons vapors, allowing this stream to continue to the vacuum system, transferring the condensate of volatile fatty acids, micronutrients together with some volatiles to a vacuum distillation operation in distillation B in step (vi).

According to the method the least volatile fraction in step (iii) may be condensed at elevated temperature within the range from 130 to 220° C., preferably within a range from 140 to 160° C., to condense the majority of neutral oil from the vapour phase, and to recover a product of neutral oil stream from step (i).

The method according to the invention may have any combinations of the above mentioned alternatives, and is thus not limited to anyone of the mentioned alternatives. Further aspects and embodiments of the invention are defined by the sub-claims. The invention will be further be illustrated by the accompanying drawings and be presented in the following detailed description of embodiments of the invention. The invention will also be illustrated by the following examples. The below figures and examples are intended to illustrate the invention not to limiting the scope of invention. If not otherwise stated in the examples and tables the percentage is given by percent by weight (wt %).

DETAILED DESCRIPTION OF THE DRAWINGS

Figure 1:
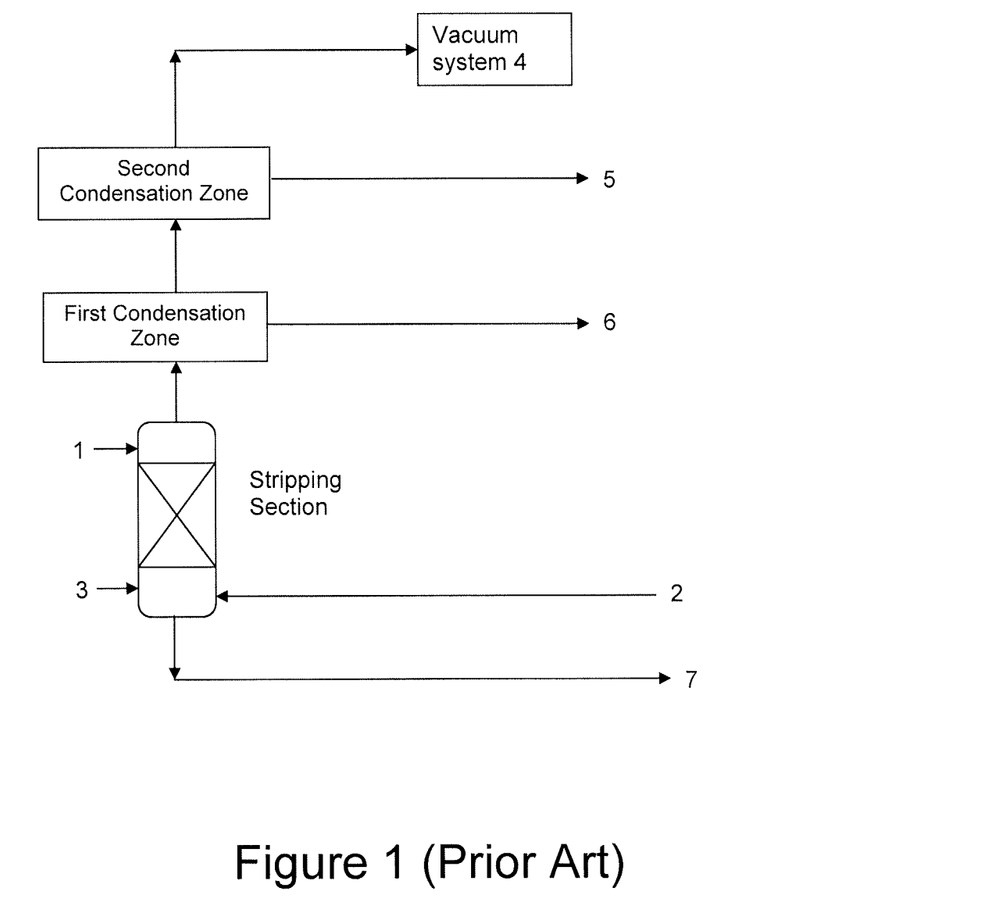
FIG. 1 discloses a prior art method for treating vegetable oils and/or animal fats.

FIG. 1 illustrates one embodiment of prior art wherein an oily feed stream 1 is feed to a vacuum steam stripping section together with stripping steam 2 and in-leakage of air 3. Fatty acids, micronutrients together with other volatiles, and neutral oils are stripped off and transferred to a high temperature condensing zone. At the high temperature condensing zone a stream enriched in micronutrients 6 is condensed and separated off from the feed. The remaining volatiles not condensed in the high temperature condensation zone is further transferred to a cold condensation zone, producing a fatty acid product stream 5 which is condensed, and a stream 4 of steam, non-condensable gases along with traces of fatty acids and other lighter hydrocarbons vapors, allowing stream 4 to continue to vacuum system. From the vacuum steam stripping section a product of neutral oil stream 7 is recovered.

Figure 2:
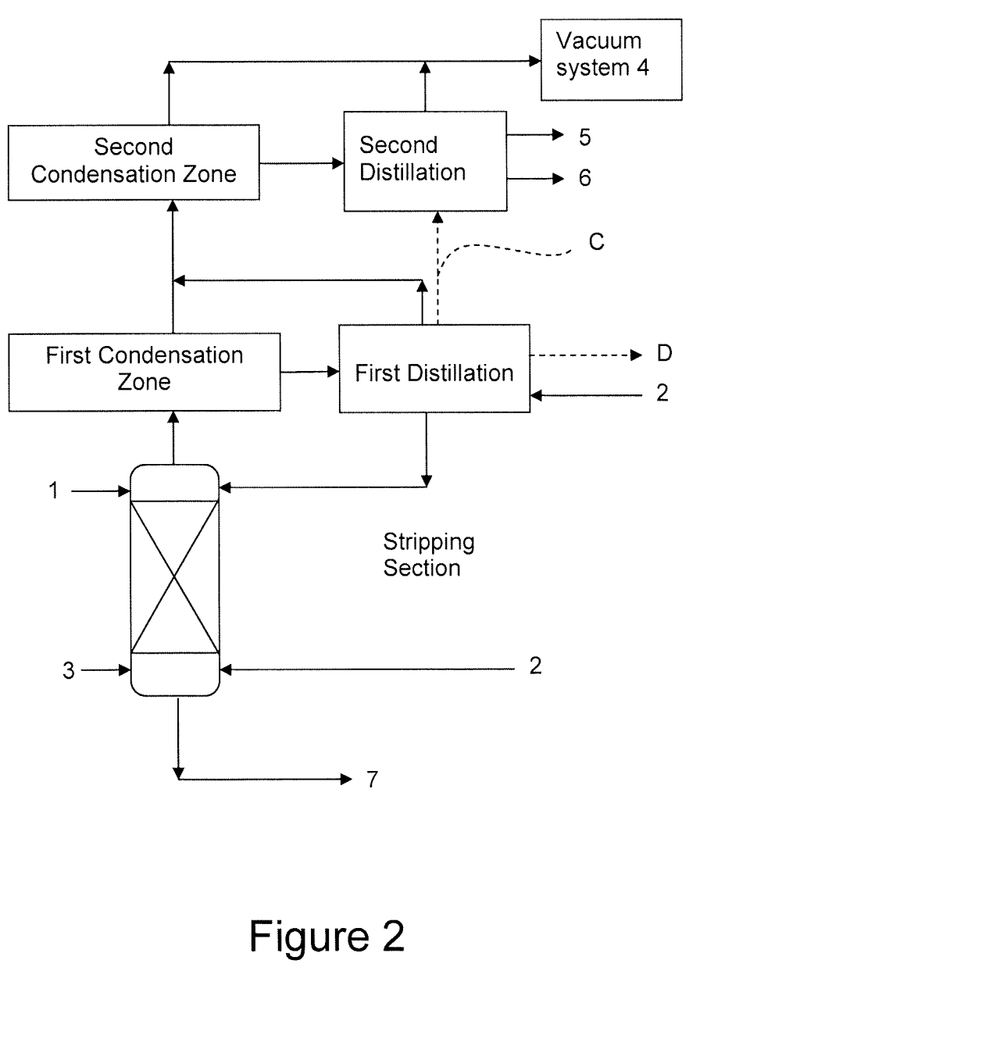
FIG. 2 is showing a sketch of the present invention.

FIG. 2 is showing a sketch of the method of the present invention wherein an oily feed stream 1 is feed to a vacuum steam stripping section together with stripping steam 2 and in-leakage of air 3. Oily feed stream 1 containing, amongst other components, free fatty acids and micronutrients. The method comprises feeding feed stream 1 to vacuum steam stripping section. The vacuum steam stripping section is suitably operating within a range of 1 to 10 mbar, preferably 1.5 to 5 mbar vacuum level. Fatty acids are stripped off together with other volatiles such as some of the micronutrients, some "neutral oil", i.e. mixtures of tri-, di- and mono-acylglycerides. The steam along with volatile components is transferred to a high temperature condensation zone. At the high temperature condensation zone the least volatile fraction is condensed at elevated temperature. The temperature in the temperature condensation zone is suitably within the range 130 to 220° C., preferably within the range 140 to 160° C., to condense the majority of neutral oil from the vapour phase. The condensed fraction from the high temperature condensation zone transferred to distillation step A and to recover a product of neutral oil stream. The product of neutral oil stream from distillation A could be returned, to the main column, i.e. the stripping section, either directly or indirectly The condensation zone may be implemented in a number of well-known ways, such as scrubbing with condensate, quenching with a colder stream, or using a low pressure drop indirect condenser.

The present invention shows a significant difference to the prior art, in that the condensate from the high temperature condensation stage is not taken out as a product stream. Instead the condensate according to the present invention is subjected to a distillation operation, i.e. distillation A. In distillation A the high temperature condensate is separated into neutral oil, mainly consisting of TAG and DAG, and a volatile stream rich in micronutrients. Optionally, stripping steam may be added to distillation A to enhance the removal of micronutrients from the neutral oil. The bottoms product from distillation A is returned, directly or indirectly, partly or fully, to the main column, i.e. the stripping section. Overhead product from distillation A continues to the low temperature condensation stage along with vapors from the high temperature condensation stage. As an alternative the overhead product from distillation A may be sent directly to distillation B by route C without passing cold temperature condensation zone.

As an alternative the overhead system of this first distillation A a stream D may be withdrawn rich in certain micronutrients and certain neutral oil, in this way adjusting the composition of the stream of micronutrients produced in step (v) and also produce a separate product stream with certain micronutrients and neutral oils.

The low temperature condensation stage may be implemented by a number of well-known methods, such as scrubbing the gas with cold condensate or with indirect heat exchange via a surface cooler. The cold temperature condensation zone produces a low temperature condensate. The cold temperature condensate is sent to distillation B. Non-condensable gases along with traces of fatty acids and other lighter hydrocarbons vapors, i.e. stream 4 from the low temperature condensation stage, and continues to the vacuum system. Distillation B produces a fatty acid product stream 5 and a stream enriched in micronutrients 6.

The two vacuum distillation operations distillation A and distillation B may be selected from a number of known methods, but not limited to, from the group of distillation operations consisting short-path distillation, wiped-film evaporators, vacuum flash operations, counter-current multistage distillation columns. The vacuum level may thus be set as low as 0.001 mbar as feasible in short-path distillation units, or be up to the 1 to 10 mbar, preferably 2 to 5 mbar range to match the vacuum level already existing in the top part of the cold condensation stage.

Compared to the prior art at least three significant improvements of the present invention can be highlighted:

(i) The addition of a vacuum distillation operation distillation A to the high temperature condensation stage enables retention of neutral oil while recovering valuable micronutrients. Removal of neutral oil from distillation A to the stripping section furthermore enables achievement of micronutrient enriched streams much beyond what is achievable with prior art.

(ii) Micronutrients from the high temperature condensation stage are quickly cooled and quantitatively captured in the cold condensation stage, alternatively captured in the overhead system in distillation B, thus leading to an essentially no-loss operation for the micronutrients.

(iii) The two vacuum distillation operations A and B may be optimized and configured to balance micronutrient concentrations and yields as will be further illustrated by the examples.

Figure 3:
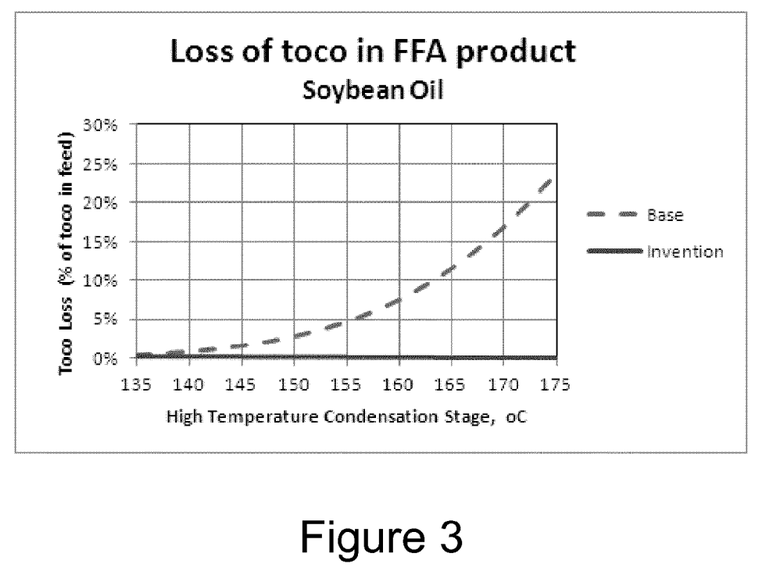
FIG. 3 is showing a graph of the loss of tocopherols to the FFA product as function of temperature in the high temperature condensation stage.

FIG. 3 is showing a graph of the loss of tocopherols to the FFA product as function of temperature in the high temperature condensation stage. The graph is a comparison between the background art, Example 1 see below, and the invention, Example 2 see below. The comparison was performed at a temperature of the hot temperature condensation stage of 160° C. A systematic investigation were performed over a wide range of condensation temperatures from 135° C. to 175° C. to quantify the advantageous behavior of the invention compared to the background art.

Figure 4:
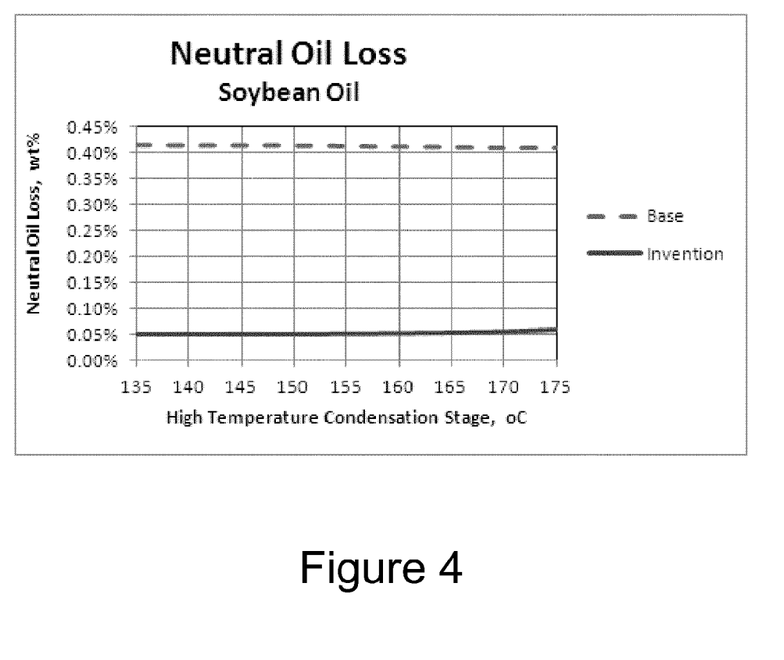
FIG. 4 is showing the neutral oil loss.
Figure 5:
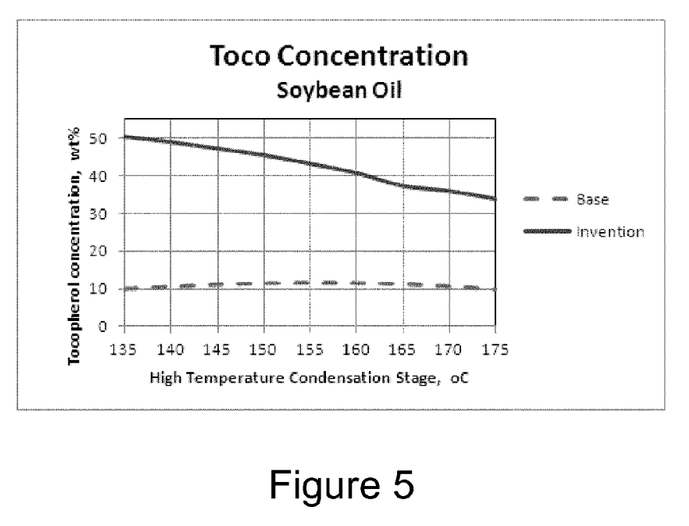
FIG. 5 is showing the tocopherol concentration in the micronutrient enriched product.

The graphs in FIGS. 3 to 6 are based on the results of Example 1 and 2, see below. FIG. 3 is showing the comparison of the loss of tocopherol to the FFA product, and the graph in FIG. 3 show that the invention provides essentially full retention of the tocopherols, while the background art only approaches such low losses at very low temperatures. However, at very low temperatures the tocopherol concentration is unattractively low with the prior art as shown in FIG. 5.

FIG. 4 is showing the neutral oil loss. The neutral oil loss consistently being only about 10% of the neutral oil loss in the prior art. This corresponds to essentially quantitative retention of the TAG and DAG in the refined oil product, while the MAG content of the feed, which has been assumed to be 0.05%, is found in either the micronutrient or the FFA products. While the prior art could be modified to simply return the condensate from the high temperature condensation stage to the stripper, this would, especially at the low temperatures in the high temperature condensation stage, lead to unacceptably high retention of the micronutrients in the refined oil product.

FIG. 5 is showing the tocopherol concentration in the micronutrient enriched product. The prior art shows, for the particular example, a maximum concentration of about 12% tocopherol at 155 to 160° C., at higher temperatures diluted by neutral oil, at lower temperatures diluted by FFA. In contrast, the invention benefits from lower temperatures in the high temperature condensation stage, approaching tocopherol concentrations of 50%. efficiently.

EXAMPLES

Example 1 (Comparative, Background Art)

This comparative test was performed according to the simplified flow diagram in FIG. 1 and the mass balance shown below in Table 1. The mass balance represents a 1,000 ton oil/day processing case. The oil composition used is typical for soybean oil, which has gone through upstream processing with PLC enzymes to convert phospholipids to diacylglycerides (DAG).

The oils fed to the stripper column at 270° C. and 1.5% stripping steam is applied for stripping, according to the method shown in FIG. 1. The high temperature condensation is taking place at 160° C. and the low temperature condensation at 55° C., in both cases simulated by scrubbing the vapours with a condensate at those temperature levels. The vacuum level at the top of the cold condensation stage was 1.5 mbar. The mass balance was established using a process simulator (PRO/II version 9.1 from SimSci-Esscor) combined with a proprietary Alfa Laval property database for lipids. The results are shown in Table 1.

TABLE 1

| | Stream | | | | | | |
|---|---|---|---|---|---|---|---|
| | 1 | 2 | 3 | 4 | 5 | 6 | 7 |
| Flow [kg/hr] | 41666.7 | 645.2 | 10.0 | 675.7 | 248.0 | 280.0 | 41118.3 |
| Composition [wt %] | | | | | | | |
| TAG | 96.9665 | — | — | — | 0.0017 | 17.6471 | 98.1395 |
| DAG | 1.8000 | — | — | — | 0.2659 | 35.3421 | 1.5818 |
| MAG | 0.0500 | — | — | 0.0001 | 4.2272 | 3.6610 | 0.0002 |
| FFA | 0.5910 | — | — | 0.0491 | 93.0340 | 5.4458 | 0.0000 |
| Tocopherols | 0.1200 | — | — | — | 1.5208 | 11.4889 | 0.0343 |
| Sterols | 0.4200 | — | — | — | 0.7309 | 26.1886 | 0.2429 |
| Squalene | 0.0025 | — | — | — | 0.1027 | 0.2223 | 0.0004 |
| Water | 0.0500 | 100.00 | — | 98.4708 | 0.1168 | 0.0042 | 0.0009 |
| Air | — | — | 100.00 | 1.4800 | — | — | — |
| Σ | 100.00 | 100.00 | 100.00 | 100.00 | 100.00 | 100.00 | 100.00 |

The mass balance deviation was 0.011 kg/hr.

The following is apparent from this comparative example:

A) The cold condensate has a tocopherol concentration of 1.5% and in total 7.5% of the tocopherol in the feed is lost to this cold condensate, corresponding to 3.8 kg per hr.

B) The loss of neutral oil, being defined as TAG+DAG+MAG, to the hot and cold condensates amounts to 170 kg per hr.

C) The concentration of tocopherols in the high temperature distillate stream (6) is only 11.5%, having a high concentration of neutral oil and FFA. This low tocopherol concentration gives the micronutrient stream less commercial value, due to higher handling and transportation costs to a purification facility.

Recalculated to annual losses (at 330 operating days per year) this corresponds to a loss of 30 ton/year of tocopherols and 1,344 ton/year of neutral oil. At present soy oil has a price of about 1,200 $/ton and tocopherol in enriched streams about 35,000 $/ton (on a 100% tocopherol basis, i.e. a 10% concentrate is worth 3,500 $/ton). In monetary terms these losses therefore translate to 1 mill $/year tocopherol value and 1.6 mill $/year neutral oil losses, total of about 2.6 mill $ lost per year. Setting the value of the fatty acid product stream (5) at 700 $/ton we can calculate a total product value by adding up the value of all the product streams see Table 2.

TABLE 2

| | million $/year |
|---|---|
| Value of oil | 390.79 |
| Value of cold distillate (FFA) | 1.37 |
| Value of hot distillate (Tocopherols) | 8.92 |
| Total product value | 401.08 |

This base case value of 401.1 mill $/year shall be used as part of the basis to illustrate the value of the present invention.

Example 2 (The Invention)

In Example 2 the stripping section and condensation stages were under the same temperatures and vacuum levels as in Example 1. The high temperature condensation stage was thus operated at 160° C. Distillation A was simulated with a column of 6 theoretical stages, the top stage (stage 1) being a partial condenser operating at 223° C. and 3 mbar, the feed coming into stage 3. Reboiler temperature was 260° C. To assist separation of micronutrients stripping steam amounting to 10% by weight of the hot scrubber condensate was added below stage 2, i.e. mixed with the vapors from the reboiler.

Distillation B was simulated with a column of 5 theoretical stages, the top stage being the condenser operating at the bubble point of the overhead product at 2.3 mbar, in this case 54° C. The column was specified to operate at a reflux ratio of 0.1 by weight, i.e. the reflux condensate from the condenser being 10% of the overhead product. The reboiler temperature was set such that the free fatty acid (FFA) content in the toco-enriched product was 1%, in this example that resulted in a reboiler temperature of 250° C. In Table 3 the mass balance for PFD of FIG. 2 is summarized.

TABLE 3

| | Stream | | | | | | |
|---|---|---|---|---|---|---|---|
| | 1 | 2 | 3 | 4 | 5 | 6 | 7 |
| Flow [kg/hr] | 41666.7 | 678.7 | 10.0 | 709.0 | 250.9 | 84.5 | 41310.9 |
| Composition [wt %] | | | | | | | |
| TAG | 96.9665 | — | — | — | 0.0000 | 0.0039 | 97.8016 |
| DAG | 1.8000 | — | — | — | 0.0000 | 1.1645 | 1.8131 |
| MAG | 0.0500 | — | — | 0.0002 | 2.1087 | 18.2632 | 0.0002 |
| FFA | 0.5910 | — | — | 0.0412 | 97.7021 | 1.0000 | 0.0000 |
| Tocopherols | 0.1200 | — | — | — | 0.0286 | 40.7445 | 0.0375 |
| Sterols | 0.4200 | — | — | — | 0.0012 | 37.8080 | 0.3462 |
| Squalene | 0.0025 | — | — | — | 0.0048 | 1.0159 | 0.0004 |
| Water | 0.0500 | 100.00 | — | 98.5482 | 0.1546 | 0.0000 | 0.0009 |
| Air | — | — | 100.00 | 1.4104 | — | — | — |
| Σ | 100.00 | 100.00 | 100.00 | 100.00 | 100.00 | 100.00 | 100.00 |

Example 2 is showing the virtual absence of TAG and very low content of DAG in the micronutrient product (stream 6) and absence of TAG and DAG from the FFA product (stream 5). The loss of neutral oil (TAG+DAG+MAG) is only 0.05% of the incoming feed, or 22 kg/hr, which is considerably lower than the 170 kg/hr in Example 1.

Even more important is that there is virtually no loss of tocopherols or other micronutrients to the FFA product stream, the loss of tocopherols being less than 0.14% of the tocopherols in the feed stream, or about 70 grams per hour. Considerably down from the 3.8 kg/hr tocopherol loss in the base case. Most notably is furthermore that the tocopherol concentration in the enriched product has now reached 40%, much higher than what is achievable in Example 1.

The savings in this example is therefore 148 kg/hr of neutral oil and 3.7 kg/hr of tocopherol. On an annual basis that is 1170 ton neutral oil and 29 ton tocopherol saved, which at the same as in the base case is an annual saving of 1170×1,200+29×35,000=2.4 million USD/year.

The economic value of the FFA rich product is included the value of all the product streams is shown in Table 4.

TABLE 4

| | million $/year |
|---|---|
| Value of oil | 392.62 |
| Value of cold distillate (FFA) | 1.39 |
| Value of hot distillate (Tocopherols) | 9.55 |
| Total product value | 403.56 |

Figure 6:
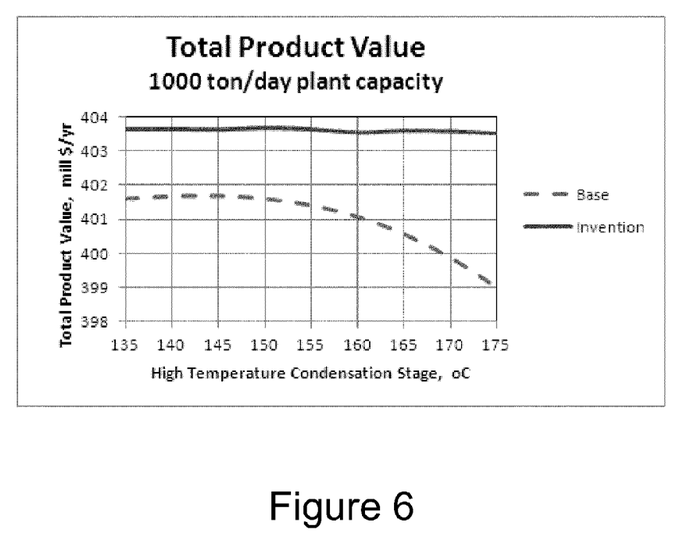
FIG. 6 is showing the total product value.

The results of Example 1 and 2 are illustrated by graphs in FIGS. 3 to 6. FIG. 3 is showing a graph of the loss of tocopherols to the FFA product as function of temperature in the high temperature condensation stage, FIG. 4 is showing the neutral oil loss, FIG. 5 is showing graph of the tocopherol concentration in the micronutrient enriched product, and FIG. 6 is showing the total product value, see above in "[D]etailed description of the drawings".

The invention claimed is:

1. A method for deacidification of fats and oils comprising the following steps:
   step (i) feeding an oily feed stream to a vacuum steam stripping section, stripping off volatile phases;
   step (ii) feeding the stripped off volatile phases to a first condensation zone, obtaining a condensed phase and a vapour phase, sending the condensed phase to a first distillation and sending the vapour phase to a second condensation zone, wherein the first condensation zone has a higher temperature than the second condensation zone;
   step (iii) subjecting the condensed phase to vacuum distillation operation in the first distillation obtaining a volatile stream rich in micronutrients and fatty acids and a condensed oily phase;
   step (iv) feeding the vapour phase from the first condensation zone, step (ii), optionally along with the volatile stream from the first distillation to the second condensation zone producing a stream of non-condensable gases and a condensate, letting the stream of non-condensable gases to continue to a vacuum system and feeding the condensate to a second distillation; and
   step (v) subjecting the condensate to the second distillation producing a stream of fatty acids, a stream of micronutrients, and a stream of non-condensables, said non-condensables being sent to the vacuum system together with the stream of non-condensable gases from the second condensation zone to form a stream of all non-condensable gases.

2. A method according to claim 1, wherein the vacuum steam stripping section in step (i) operates at pressure within the range from 1 to 10 mbar.

3. A method according to claim 1, wherein the stripped off volatile phase from the vacuum steam stripping section in step (i) is condensed in the first condensation zone in step (ii) at a temperature within the range from 130 to 220° C.

4. A method according to claim 1, wherein step (ii) also comprises scrubbing the gas with cold condensate or takes place using indirect heat exchange via a surface cooler.

5. A method according to claim 1, wherein condensed oily phase from the first distillation in step (iii) are transferred back to the vacuum steam stripping section in step (i).

6. A method according to claim 1, wherein the obtained volatile stream rich in micronutrients and fatty acids from the first distillation in step (iii) is sent directly to the second distillation in step (v) by a route without passing the second condensation zone in step (iv).

7. A method according to claim 1, wherein the obtained volatile stream rich in micronutrients and fatty acids from the first distillation in step (iii) is sent along with vapours from the first condensation zone in step (ii) to the second condensation zone in step (iv) obtaining a condensate and a stream of non-condensable gases.

8. A method according to claim 1, wherein the first and second distillations are one or more selected from the group consisting of short-path distillation, wiped-film evaporators, vacuum flash operations, and counter-current multistage distillation columns.

9. A method according to claim 1, wherein a pressure in the first distillation and a pressure in the second distillation is at least 0.001 mbar and 10 mbar or less.

10. A method according to claim 1, wherein step (i) comprises feeding an oily feed stream comprising volatiles, micronutrients and neutral oils, to the vacuum steam stripping section, step (i) comprises also stripping off fatty acids together with other volatiles, and neutral oils.

11. A method according to claim 10, wherein step (ii) comprises feeding the stripped off fatty acids, micronutrients together with other volatiles, and neutral oils to the first condensation zone, condensing fatty acids, micronutrients together with some volatiles and neutral oils from vapour phase and sending the condensed fatty acids, micronutrients together with some volatiles and neutral oils to the first distillation in step (iii), and allowing steam, volatile fatty acids, some micronutrients together with other volatiles to pass to the second condensation zone in step (iv).

12. A method according to claim 11, wherein step (iii) comprises subjecting the condensed fatty acids, micronutrients together with some volatiles and neutral oils to distillation in the first distillation in step (iii) obtaining a volatile stream rich in micronutrients and fatty acids and removing neutral oils in the first distillation, transferring the condensed neutral oils back to the vacuum steam stripping section in step (i), and transferring the obtained stream rich in micronutrients and fatty acids to the second condensation zone in step (iv) along with vapors from the first condensation zone in step (ii).

13. A method according to claim 12, wherein step (iv) comprises condensing volatile fatty acids, micronutrients together with other volatiles in the second condensation zone obtaining a condensate and a stream comprising steam, non-condensable gases along with traces of fatty acids and other lighter hydrocarbons vapors, allowing the stream to continue to the vacuum system, transferring the condensate of volatile fatty acids, micronutrients together with some volatiles to distillation in the second distillation in step (vi).

14. A method according to claim 12, wherein a least volatile fraction in step (iii) is condensed at a temperature within the range from 130 to 220° C., to condense a majority of neutral oil from the vapour phase, and to recover a product of neutral oil stream from step (i).

15. A method according to claim 1, wherein step (iii) comprises withdrawing a stream rich in certain micronutrients and certain neutral oil from the first distillation.

\* \* \* \* \*